US010753394B2

(12) United States Patent
Rocchi et al.

(10) Patent No.: US 10,753,394 B2
(45) Date of Patent: Aug. 25, 2020

(54) METHOD FOR COATING A TURBOMACHINE PART WITH A SELF-LUBRICATING COATING AND PART COATED BY SAID METHOD

(71) Applicant: LIEBHERR-AEROSPACE TOULOUSE SAS, Toulouse (FR)

(72) Inventors: Jerome Rocchi, Roqueseriere (FR); Gregory Grau, Castelmayran (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 0 days.

(21) Appl. No.: 16/288,352

(22) Filed: Feb. 28, 2019

(65) Prior Publication Data

US 2019/0195280 A1    Jun. 27, 2019

Related U.S. Application Data

(63) Continuation of application No. 15/100,606, filed as application No. PCT/EP2014/076705 on Dec. 5, 2014, now abandoned.

(30) Foreign Application Priority Data

Dec. 5, 2013 (FR) ...................... 13 62190

(51) Int. Cl.

| F16C 32/06 | (2006.01) |
|---|---|
| F16C 33/10 | (2006.01) |
| C23C 4/11 | (2016.01) |
| C23C 4/134 | (2016.01) |
| F16C 17/04 | (2006.01) |
| F16C 33/04 | (2006.01) |
| F16C 17/02 | (2006.01) |

(52) U.S. Cl.
CPC ............ *F16C 33/1095* (2013.01); *C23C 4/11* (2016.01); *C23C 4/134* (2016.01); *F16C 17/042* (2013.01); *F16C 33/043* (2013.01); *F16C 17/024* (2013.01); *F16C 2202/50* (2013.01); *F16C 2206/42* (2013.01); *F16C 2206/44* (2013.01); *F16C 2223/42* (2013.01); *F16C 2360/00* (2013.01)

(58) Field of Classification Search
CPC .. F16C 17/024; F16C 17/042; F16C 33/1095; F16C 2223/42
See application file for complete search history.

(56) References Cited

U.S. PATENT DOCUMENTS

| 1,654,939 | A | * | 1/1928 | Loebs | .................... B60D 1/155 |
|---|---|---|---|---|---|
| | | | | | 280/482 |
| 3,677,612 | A | | 7/1972 | Barnett et al. | |
| 3,975,568 | A | | 8/1976 | Rudness | |
| 4,227,756 | A | | 10/1980 | Bhushan | |
| 5,087,529 | A | * | 2/1992 | Engel | ...................... F16C 33/14 |
| | | | | | 427/405 |
| 5,833,369 | A | * | 11/1998 | Heshmat | .................. F16C 27/02 |
| | | | | | 384/105 |
| 5,866,518 | A | | 2/1999 | Dellacorte et al. | |
| 7,297,367 | B2 | | 11/2007 | Oboodi et al. | |
| 7,615,291 | B2 | * | 11/2009 | Lee | .......................... C09D 7/69 |
| | | | | | 428/701 |
| 7,892,659 | B2 | | 2/2011 | Oboodi et al. | |
| 2006/0254418 | A1 | | 11/2006 | Barbezat | |
| 2007/0230842 | A1 | * | 10/2007 | Tamaoka | ............... F16C 17/026 |
| | | | | | 384/121 |
| 2007/0292056 | A1 | | 12/2007 | Woydt | |
| 2008/0057223 | A1 | | 3/2008 | Lee et al. | |
| 2009/0176110 | A1 | | 7/2009 | Pabla et al. | |
| 2010/0177997 | A1 | | 7/2010 | Lee | |
| 2010/0310763 | A1 | | 12/2010 | Oboodi et al. | |
| 2014/0169707 | A1 | * | 6/2014 | Yoshino | ................ F16C 17/042 |
| | | | | | 384/105 |
| 2014/0254964 | A1 | | 9/2014 | Thumm et al. | |

FOREIGN PATENT DOCUMENTS

| EP | 2366813 A2 | | 9/2011 | |
|---|---|---|---|---|
| JP | 59047523 A | * | 3/1984 | ............ F16C 33/043 |
| JP | 59047523 A | | 3/1984 | |
| WO | 2007004770 A1 | | 1/2007 | |

OTHER PUBLICATIONS

Dellacorte et al: "Evaluation of advanced solid lubricant coatings for foil air bearings operating at 25 [deg.] 3nd 500[deg.]C", Tribology Transactions, vol. 42, No. 2, Jan. 1, 1999 (Jan. 1, 1999), pp. 338-342, XP055165381, ISSN: 1040-2004 the whole document p. 342, col. 1, lines 11-12.

* cited by examiner

Primary Examiner — Phillip A Johnson
(74) Attorney, Agent, or Firm — Volpe and Koenig, P.C.

(57) ABSTRACT

A method for coating a turbomachine part with a self-lubricating includes: providing a rotor or thrust disc of the turbomachine; applying, by a thermal spraying process, a self-lubricating coating having of a mixture of 50 to 90 wt % of alumina ($Al_2O_3$) with titanium oxide ($TiO_2$) to a surface of the rotor and/or a surface; and finishing the coated surface of the rotor and/or thrust disc.

11 Claims, No Drawings

METHOD FOR COATING A TURBOMACHINE PART WITH A SELF-LUBRICATING COATING AND PART COATED BY SAID METHOD

CROSS REFERENCE TO RELATED APPLICATIONS

This application is a continuation of U.S. patent application Ser. No. 15/100,606, filed Sep. 8, 2016, which is a § 371 National Phase of International Patent Application No. PCT/EP2014/076705, filed Dec. 5, 2014 which claims priority of French Patent Application No. 1362190, filed Dec. 5, 2013, the entire contents of all of which are incorporated by reference herein as if fully set forth.

FIELD OF THE INVENTION

The present invention relates to a self-lubricating coating material for high-temperature use and to a part coated with such a material.

BACKGROUND

Most turbomachinery reaches very high rotational speeds, for example from 20,000 to 120,000 revolutions per minute (rpm). To guide a rotor rotating at such speeds, it is conventional to use foil bearings instead of conventional ball bearings which are not compatible with such rotational speeds. A film of ambient air is used to support a rotor which is thus "levitated" relative to a fixed housing. Such a bearing is therefore also called a foil-air bearing.

When the rotor rotates at high speed, there is no contact between the various solid components of the bearing. However, before and after a phase of high-speed rotation, at startup or shutdown, the film of air which serves as a bearing has not been formed in the stationary housing, and a foil, called the top foil, of the foil bearing is in local contact with both the rotor and the fixed housing that receives them. Means to limit friction between these elements should then be provided at the contact surfaces.

It is known to use PTFE (Polytetrafluoroethylene) as a lubricant to prevent wear of the parts in a foil bearing during the startup and shutdown phases. This material is usually covering a foil of the bearing which faces the rotating part, also called the top foil, and has good performance at relatively low temperatures but cannot be used at high temperatures (above 200° C. or so).

When the rotor is part of a machine with a relatively powerful electric motor, the motor is a source of heat. The ambient air used for ventilation in this machine is then hot air. Due to the heat of the motor plus the heat locally generated by friction, insufficient heat dissipation may occur and high temperatures of around 300 to 400° C. can be reached.

U.S. Pat. No. 5,866,518 proposes a composite self-lubricating material to reduce friction and wear which can be used over a very wide temperature range, from cryogenic temperatures to temperatures up to 900° C. This material comprises 60 to 80 wt % (percentage by weight) of chromium oxide dispersed in a metal binder of an alloy containing chromium and possibly nickel as well as 5 to 20 wt % of a fluoride from groups I or II, or a rare earth metal and possibly a metal lubricant.

U.S. Pat. No. 7,297,367 relates to a method for applying an inorganic lubricant coating deposited on a top foil of a foil bearing in order to withstand higher temperatures than inorganic coatings of the prior art. The coating is applied by spraying or by immersion.

The present invention therefore aims to provide a new coating to protect the foil(s) of a foil bearing from wear and to withstand high temperatures.

SUMMARY

The invention relates to protecting the usually uncoated top foil of the bearing from wear. It also preferably relates to providing protection for thrust discs which may also be subjected to friction.

DETAILED DESCRIPTION OF THE PREFERRED EMBODIMENTS

To this end, the invention proposes the use of a coating comprising between 50 and 90 wt % of alumina ($Al_2O_3$) and an oxide selected from the group consisting of titanium oxide ($TiO_2$), chromium oxide ($Cr_2O_3$), and a mixture of these, as a self-lubricating coating for the high-temperature use of a rotor in a foil bearing.

Tests have shown that such a coating, preferably purely ceramic and without metal binder, has good lubricating properties and is particularly well-suited for withstanding high temperatures. A preferred embodiment provides that the coating used consists of a mixture of 50 and 90 wt % of alumina ($Al_2O_3$) with an oxide selected from the group consisting of titanium oxide ($TiO_2$), chromium oxide ($Cr_2O_3$), and a mixture of these.

In a preferred embodiment, the coating of the invention is a mixture of alumina ($Al_2O_3$) and titanium oxide ($TiO_2$). Tests have shown that titanium oxide is preferred to chromium oxide which, however, also achieves good performance in terms of lubrication and resistance at high temperatures. According to these tests, the coating preferably comprises between 65 and 75 wt % of alumina ($Al_2O_3$).

The invention also relates to a turbomachine part, comprising a circular cylindrical bearing which is at least partially coated with a self-lubricating coating as described above, in other words a coating comprising between 50 and 90 wt % of alumina ($Al_2O_3$) as well as an oxide selected from the group consisting of titanium oxide ($TiO_2$), chromium oxide ($Cr_2O_3$), and a mixture of these.

Such a turbomachine part can be such that its self-lubricating coating is deposited by a thermal spraying process followed by grinding. The thermal spraying process is preferably an air plasma spraying process.

A turbomachine part according to the invention is, for example, selected from the group of parts comprising rotors and thrust discs.

The invention further relates to a turbomachine, characterized in that it comprises a turbomachine part as described above. Such a turbomachine then preferably comprises a foil-air bearing having a housing which accommodates, on the one hand, a circular cylindrical portion of a turbomachine part, said circular cylindrical portion being at least partially coated with a self-lubricating coating comprising between 50 and 90 wt % of alumina ($Al_2O_3$) and an oxide selected from the group consisting of titanium oxide ($TiO_2$), chromium oxide ($Cr_2O_3$), and a mixture of these, and on the other hand at least one foil, called the top foil, coming to face said circular cylindrical portion, said top foil being untreated.

Finally, the invention relates to an air conditioning device, characterized in that it comprises a turbomachine as described in the preceding paragraph.

Details and advantages of the invention will become clear from the following description which presents a particular embodiment of the invention.

The invention relates more particularly to the introduction of a self-lubricating coating onto a rotor or a thrust disc of a turbomachine in which the parts can rotate at high speeds (for example greater than 60,000 rpm). Such a turbomachine may or may not be powered electrically. Parts rotating at such high speeds, or the rotor, are usually mounted on foil bearings and the invention relates more particularly to machines comprising at least one bearing of this type.

A foil bearing, or foil-air bearing, comprises a housing which accommodates a circular cylindrical portion of a rotor. At very high speeds, a film of air forms between the housing and the cylindrical portion, which prevents contact of the cylindrical portion with the inner wall of the corresponding housing. However, contact may occur when a steady state is not yet established. It is therefore arranged to have a sheet of lubricant material to prevent wear of the housing and/or of the corresponding cylindrical portion. This sheet provides lubrication of the bearing in the startup and shutdown phases of the rotating part.

Documents U.S. Pat. No. 7,297,367 and WO 2007/004770 show two different types of foil bearings to which the present invention can be applied. Other types of bearings allowing (very) high rotational speeds can also be concerned by the present invention.

A thrust disc is generally associated with a bearing and is intended to prevent longitudinal movement of the rotating part. Here too, it is necessary to provide lubrication to prevent premature wear of the thrust discs during the transitional phases (turbomachine startup and shutdown).

The invention proposes coating a rotor and/or a thrust disc, or at least the circular cylindrical portion of a rotor and/or a face of a thrust disc accommodated by a bearing, with a self-lubricating coating that allows withstanding high temperatures (for example up to 400° C.).

The proposed coating, in a preferred embodiment, is composed of alumina ($Al_2O_3$) and titanium oxide ($TiO_2$) and is applied by a thermal spraying process. This coating then has the aim of protecting from wear the coated parts in a foil-air bearing and the parts coming into contact with these coated parts, in an environment where the temperature can vary from −50° C. to +400° C., particularly during transition phases (startup, shutdown, and possibly changes in rotation speed).

While it is usual to coat a top foil of a foil-air bearing with lubricating material, the invention proposes keeping this top foil untreated, the top foil being the foil of the bearing that comes to face the circular cylindrical portion of the rotating body. The top foil therefore has no coating.

First, the invention concerns the coating itself. As indicated, in a preferred embodiment the coating comprises alumina and titanium oxide. The proportion of alumina ($Al_2O_3$) is between 50 and 90 wt % of the coating. In a preferred embodiment, this proportion is around 70%, for example between 65 and 75 wt % of the mixture forming the coating.

In the coating, titanium oxide ($TiO_2$) is present in addition to the alumina. A preferred embodiment proposes 70 wt % of alumina ($Al_2O_3$) and 30 wt % of titanium oxide ($TiO_2$).

According to an alternative embodiment of the invention, all or part of the titanium oxide may be replaced by chromium oxide ($Cr_2O_3$). The coating may thus consist of alumina (50 to 90 wt %), and titanium oxide (0 to 50 wt %) and/or chromium oxide (0 to 50 wt %).

Thus a coating according to the preferred embodiment of the present invention contains only "hard" ceramics, and no metal binder between these ceramics is provided.

Comparative tests were performed using a coating according to the preferred embodiment of the invention and a reference coating of the prior art. The selected coating of the prior art bears the reference PS304. It corresponds to a category described in U.S. Pat. No. 5,866,518. Its composition corresponds to a mixture of four components: 60 wt % of NiCr as matrix, 20 wt % of $Cr_2O_3$ to ensure wear resistance, chemical stability, and high resistance to oxidation, 10 wt % of Ag as lubricant, and 10 wt % of the eutectic $BaF_2/CaF_2$ as high-temperature lubricant.

Resisting torque measurements were made at a temperature of 300° C. While the maximum resisting torque is between 0.30 and 0.35 Nm with a coating of the prior art, it is between 0.25 and 0.30 Nm with a coating according to the invention. As for the residual resisting torque, this is substantially zero with a coating of the invention while it is about 0.01 Nm with a coating of the prior art.

The friction coefficients were also measured. At low temperatures (20° C.), the friction coefficient with a mixture of $Al_2O_3$ and $TiO_2$ according to the invention is higher (0.19 versus 0.17); however, at higher temperatures the friction coefficient decreases with the invention to about 0.13 at 300° C., while this coefficient remains almost unchanged at 300° C. (about 0.19) for the PS304 coating.

In terms of wear, the coating according to the invention is of particular interest. The wear of the coating was measured in $\mu m^3$ on a shaft after 10,000 cycles and after 100,000 cycles. With a coating of the invention, in both cases the wear is limited to a few (less than 10) $\mu m^3$, while it is about 150 $\mu m^3$ at 10,000 cycles, a wear considered too high to allow testing at 100,000 cycles.

These various tests show the excellent performance obtained with a coating according to the invention, especially in high temperature ranges. Such performance is unexpected and thus illustrates the interest of the invention.

The invention also relates to a turbomachine part at least partially coated with a ceramic self-lubricating coating as described above.

This turbomachine part is, for example, a rotor or at least a circular cylindrical portion of a rotor intended to be placed in a foil-air bearing.

This turbomachine part may also be a thrust disc, in particular a thrust disc used in combination with a foil-air bearing. It may be arranged that at least one face of the thrust disc intended to face the bearing with which is it associated is coated with a self-lubricating coating.

The turbomachine containing the bearing and a rotor and/or a thrust disc according to the invention may be any type of turbomachine. In particular, it may be a turbomachine driven by an electric motor or a turbomachine driven by a stream of air. The invention also relates to such a turbomachine.

The coating described above may be applied to a rotor or to a thrust disc (or a rotor portion or a thrust disc portion), for example by any type of thermal spraying process. Preferably, this coating is applied by an air plasma spraying process.

After spraying the coating on the rotor or on the thrust disc (or at least on a portion of the rotor or disk), the coated surface of the part is ground and/or finished by a vibratory finishing process.

The invention thus enables an air bearing to operate at higher temperatures than bearings of the prior art that use fluoropolymer coatings. A coating according to the invention can be used at temperatures up to at least 400° C., which are the temperatures encountered at very high rotational speeds and/or in electrically driven turbomachinery.

Indeed, during operation of an air bearing when the rotational speed increases, the shear of the aerodynamic film also increases. When high speeds are reached, significant thermal heating therefore occurs which causes an increase in the temperature at the bearing (and at the thrust disc).

In addition, in electrically driven machines, the heat generated by the motor warms the ambient air and also leads to a temperature increase at the air bearings and thrust discs.

The invention allows working at high temperatures. Tests have also demonstrated the high endurance of a bearing with a rotor according to the invention, as 150,000 startup/shutdown cycles were carried out at temperatures of up to 350° C.

The invention allows effective lubrication of bearings with parts rotating at speeds greater than 60,000 rpm (revolutions per minute) even in turbomachinery driven by an electric motor.

The invention may find applications for example in devices making use of turbomachinery, for example air conditioning and/or climate control devices such as those installed on aircraft for air management in a cabin and a cockpit.

Of course, the invention is not limited to the preferred embodiment and to the alternative embodiments presented above by way of non-limiting examples. It also relates to variants within reach of the skilled person that lie within the scope of the following claims.

What is claimed is:

1. A method for coating a turbomachine part with a self-lubricating coating, the method comprising:
   providing a rotor or thrust disc of the turbomachine;
   applying, by a thermal spraying process, a self-lubricating coating consisting of a mixture of 50 to 90 wt % of alumina ($Al_2O_3$) with titanium oxide ($TiO_2$) to a surface of said rotor, to a surface of said thrust disc or both to a surface of said rotor and to a surface of said thrust disc; and
   finishing the coated surface of said rotor, said thrust disc or both said rotor and said thrust disc wherein the self-lubricating coating comprises no metal binder between the alumina ($Al_2O_3$) and titanium oxide ($TiO_2$).

2. The method of claim 1, wherein the self-lubricating coating comprises between 65 and 75 wt % of alumina ($Al_2O_3$).

3. The method of claim 1, wherein the self-lubricating coating consists of 70 wt % of alumina ($Al_2O_3$) and 30 wt % of titanium oxide ($TiO_2$).

4. The method of claim 1, wherein the thermal spraying process is an air plasma spraying process.

5. The method of claim 4, wherein the coated surface is finished by grinding.

6. The method of claim 4, wherein the coated surface is finished by a vibratory finishing process.

7. The method of claim 1, wherein the surface of the rotor onto which the self-lubricating coating is applied is a circular cylindrical portion thereof.

8. The method of claim 1, wherein the surface of the thrust disc onto which the self-lubricating coating is applied is a face thereof.

9. The method of claim 1, wherein the self-lubricating coating can withstand temperatures of up to 400° C.

10. The method of claim 1, wherein the self-lubricating coating has a friction coefficient of 0.13 at 350° C.

11. A turbomachine part coated by the method of claim 1.

* * * * *